United States Patent [19]

Huang

[11] Patent Number: 4,995,278

[45] Date of Patent: Feb. 26, 1991

[54] CAR MARK EMBLEM DISPLAY AND STORAGE DEVICE

[76] Inventor: Yung C. Huang, 4 Fl., No. 136, Sec. 3, Yeng Ping N. Rd., Taipei, Taiwan

[21] Appl. No.: 386,454

[22] Filed: Jul. 27, 1989

[51] Int. Cl.[5] .......................... F16H 27/02; G03F 7/00
[52] U.S. Cl. .................................. 74/89.15; 74/83.13; 74/424.8 R; 40/591; 40/601
[58] Field of Search ............... 74/89.13, 89.15, 606 R, 74/591, 424.8 R; 40/591–601; 180/271, 287

[56] References Cited

U.S. PATENT DOCUMENTS

| | | | |
|---|---|---|---|
| 3,579,880 | 5/1971 | Murphy | 40/601 X |
| 3,609,898 | 10/1971 | Brown | 40/601 |
| 3,968,977 | 7/1976 | Wilfert | 40/591 X |
| 4,259,660 | 3/1981 | Oliver | 40/601 X |
| 4,585,147 | 4/1986 | Wodnicki | 74/89.15 X |
| 4,635,492 | 1/1987 | Uebelhart | 74/89.15 |
| 4,715,580 | 12/1987 | Mueller | 74/89.15 |
| 4,739,669 | 4/1988 | Yokose et al. | 74/424.8 R |
| 4,742,891 | 5/1988 | Kunii et al. | 74/89.15 X |
| 4,783,352 | 11/1988 | Kaiser | 40/591 |
| 4,827,646 | 5/1989 | Miller et al. | 40/591 |

FOREIGN PATENT DOCUMENTS 0030646  2/1988  Japan ................... 74/89.15

*Primary Examiner*—Vinh T. Luong

[57] ABSTRACT

A car mark emblem display and storage device for protruding the car mark emblem from the car engine hood to a display position or storing and concealing the car mark emblem in the car engine hood to prevent the car mark emblem from being stolen. The display and storage device includes a motor, a guide screw unit actuated by the motor for raising or lowering the car mark emblem, a seat vertically slidable along the guide screw unit for supporting the mark emblem, a limit control unit for controlling the upper and lower limit of the movement of the mark emblem and the action of the motor, a top cover unit also actuated by the motor for adjustably covering or uncovering a passage for the car mark emblem, and a body frame for retaining most of the above-mentioned components.

20 Claims, 3 Drawing Sheets

CAR MARK EMBLEM DISPLAY AND STORAGE DEVICE

BACKGROUND OF THE INVENTION

The present invention relates to a car mark emblem protection device, and more particularly, to a car mark emblem display and storage device.

Due to the fast growth rate of personal income, it has become quite common to buy a luxurious car such as a Mercedes Benz as a means of transportation. As a consequence, some difficult problems have arisen with respect to the protection of the car. As a Benz sedan owner, one may not worry about the car stereo being stolen, because the reliable car structure protects itself from intrusion. On the other hand, the car owner should be very concerned about the car mark emblem being stolen. Although the car mark emblem per se is not very expensive, it is very troublesome to replace a car mark emblem. To prevent the car mark emblem from being stolen when parked, the car owner may have to remove the car mark emblem and either carry it around or put it in the car. This is not a convenient way for the car owner to protect the car mark emblem.

In view of the above-mentioned inconveniences and problems, the present invention has thus arisen to provide a car mark emblem display and storage device to protect the car mark emblem form being stolen in a most effective and efficient way.

SUMMARY OF THE INVENTION

The primary object of the present invention is to provide a car mark emblem display and storage device which protects the car mark emblem of a luxury car like a Mercedes Benz from being stolen.

Another robject of the present invention is to provide a car mark emblem display and storage device which is actuated synchronously with the ignition of the car so as to display the car mark emblem when the car engine is turned on and to store the car mark emblem when the car engine is turned off.

A further object of the present invention is to provide a car mark emblem display and storage device for adjustably retaining a car mark emblem.

Further objects and advantages of the invention, which will be apparent to those skilled in the art upon reading the detailed description provided hereinbelow with appropriate reference to the attached drawings, are accomplished by a car mark emblem display and storage device comprising: a motor; a guide screw unit actuated by said motor, including two elongated parallel spaced vertically extending guide screws, a distance defined between said two elongated guide screws being such that said mark emblem retained therewithin is readily movable in a vertical direction; a seat for supporting said mark emblem, said seat being slidable vertically along said two elongated guide screws and including a circular rack for fixing a spherical stand of said mark emblem; a limit control unit including a lower limit switch, an upper limit switch, a bottom panel having a side wing, said bottom panel being slidable vertically along said two elongated guide screws, a lower face of said bottom panel being contactable with said lower limit switch when said mark emblem has been fully lowered, said side wing being contactable with said upper limit switch when said mark emblem has been fully raised; a top cover unit mounted on an engine hood, said top cover unit including a top cover with an opening for the passage of said mark emblem and a movable cover for covering said opening, said movable cover being actuated by said motor; and a body frame for retaining said motor, said guide screw unit and said seat, as well as combined with said top cover unit.

DETAILED DESCRIPTION OF THE PREFERRED EMBODIMENTS

Figure 1:
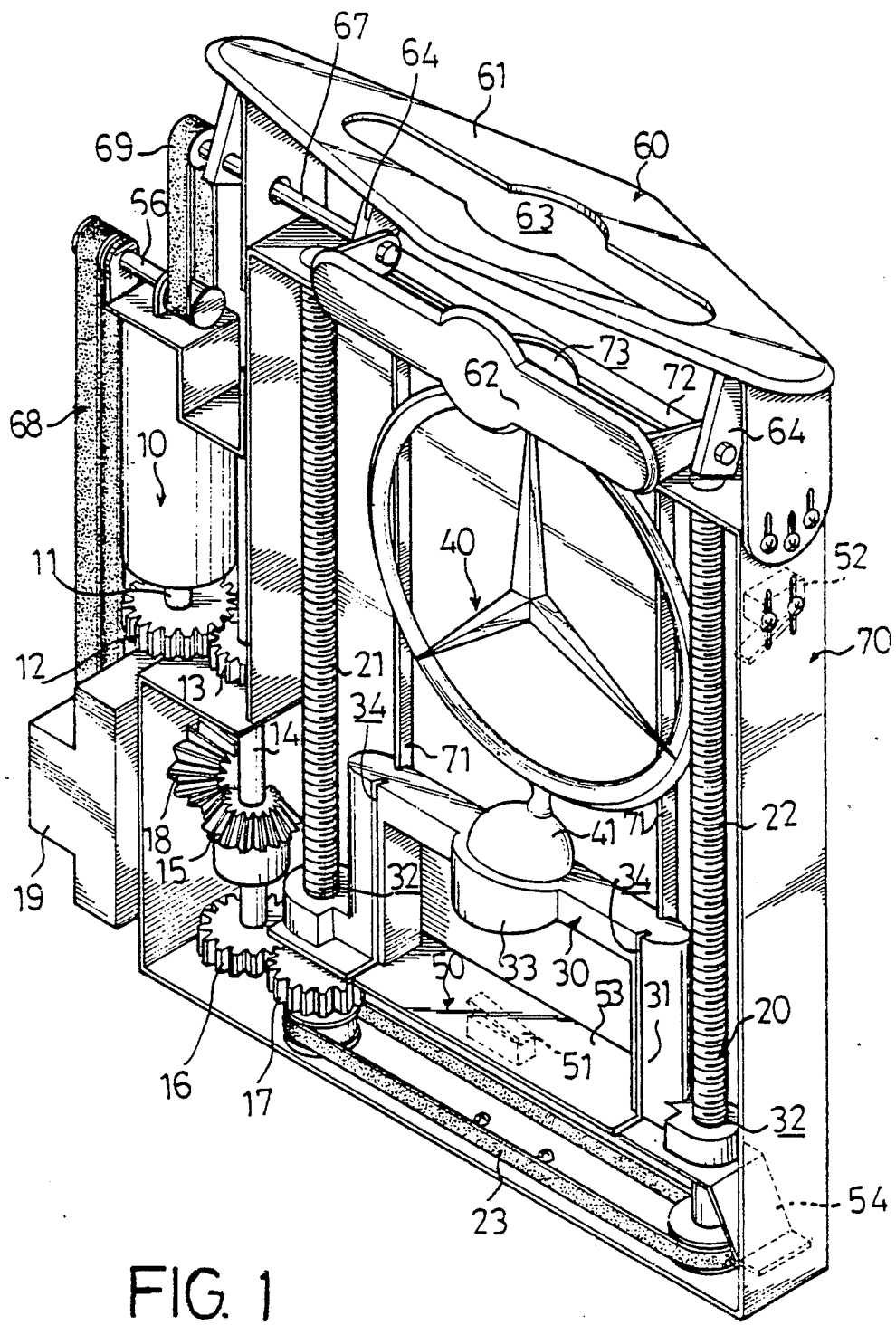
FIG. 1 is a perspective view of a car mark emblem display and storage device in accordance with the present invention.

Referring to the drawings and initially to FIG. 1, it can be seen that a car mark emblem display and storage device in accordance with the present invention comprises a motor 10, a guide screw unit 20 actuated by the motor 10, a seat 30 for supporting a mark emblem 40, a limit control unit 50, a top cover unit 60 also actuated by the motor 10, and a body frame 70 for retaining most of the above-mentioned components.

The top cover unit 60 is mounted on the engine hood to engage with the body frame 70 which is mounted within the car body below the hood. A power switch (not shown) is arranged within the driver's seat to control the motor 10. It should be noted that half of the body frame 70 is removed away from the drawings for better illustration.

For transmission of power to the guide screw 20, the motor 10 includes sequentially a first shaft 11 and a first gear 12 extending from the body of the motor 10, a second gear 13 which is meshed with the first gear 12, a second shaft 14 which is coaxial with the second gear 13, a first bevel gear 15 which is coaxial with the second gear 13, a third gear 16 which is coaxial with the second gear 13, and a fourth gear 17 which is meshed with the third gear 16.

The guide screw unit 20 includes two elongated parallel spaced vertically extending guide screws 21 and 22. The distance defined between the two elongated guide screws 21 an 22 is such that the mark emblem 40 retained therewithin can readily move in a vertical direction.

The first guide screw 21 is encompassed by the fourth gear 17 at a lower part thereof. The second guide screw 22 is engaged with the first guide screw 21 by means of a belt 23 such that the second guide screw 22 is synchronized with the first guide screw 21 which is actuated by the motor 10 through the two meshed gears 16 and 17.

The seat 30 for supporting the mark emblem 40 is arranged between the two elongated guide screws 21 and 22. Preferably, the seat 30 is an inverted U-shaped body having two lengthwise extending arms 31 each having a hole 32 so as to encompass the two elongated guide screws 21 and 22. The seat 30 also includes a circular rack 33 at an upper central part thereof for retaining the mark emblem 40.

Preferably, both arms 31 of the seat 30 are formed with a front and a rear vertical guiding groove 34, respectively. Consequently, the body frame 70 is provided with corresponding guiding rails 71 so as to guide the vertical movement of the seat 30 along the two guide screws 21 and 22.

As is common, the mark emblem 40 includes a spherical stand 41. The spherical stand 41 is set in the partially circular rack 33 of the seat 30 and ajustably arranged therein.

Figure 2:
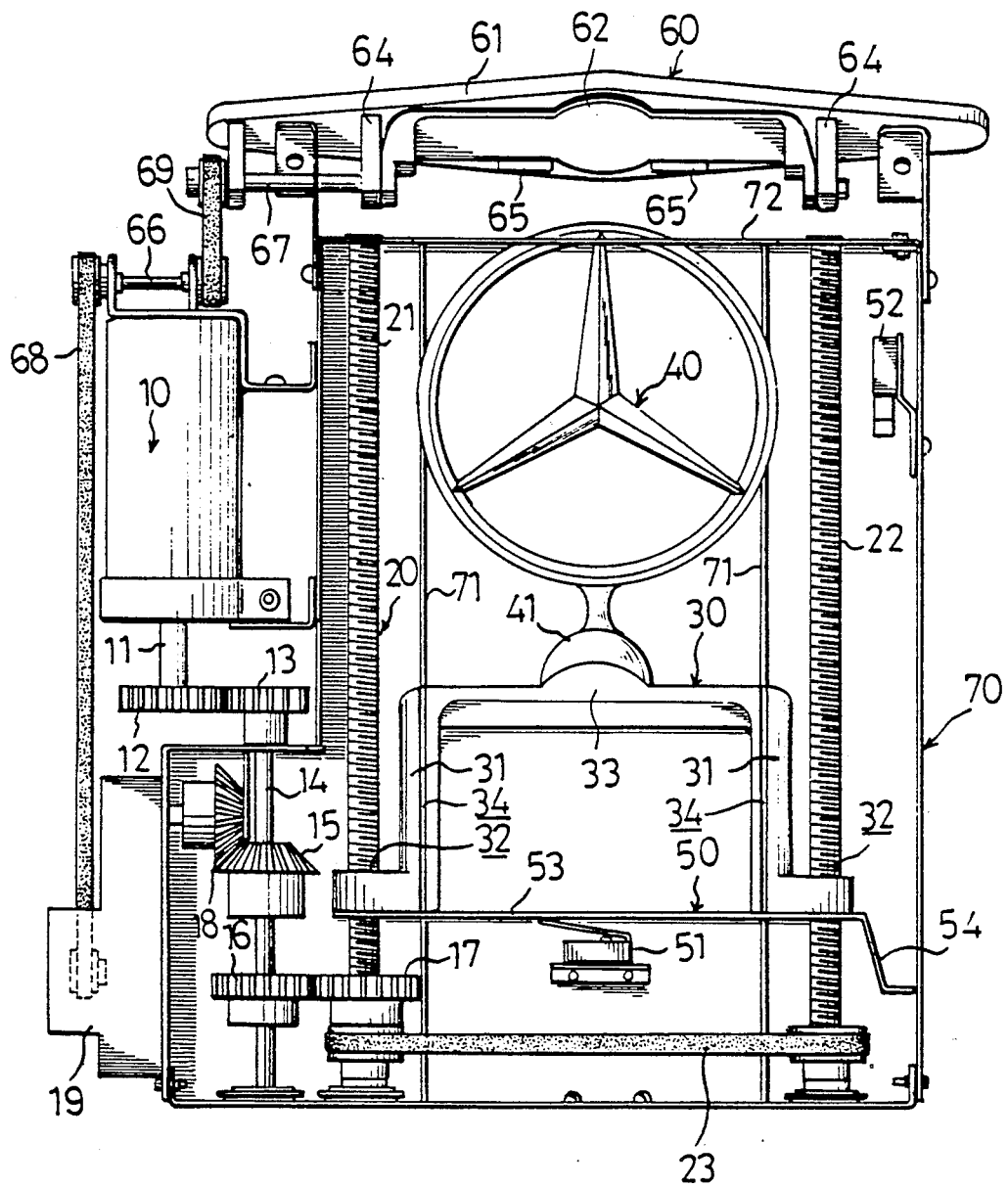
FIG. 2 is a front view showing the car mark emblem in a storage position.
Figure 3:
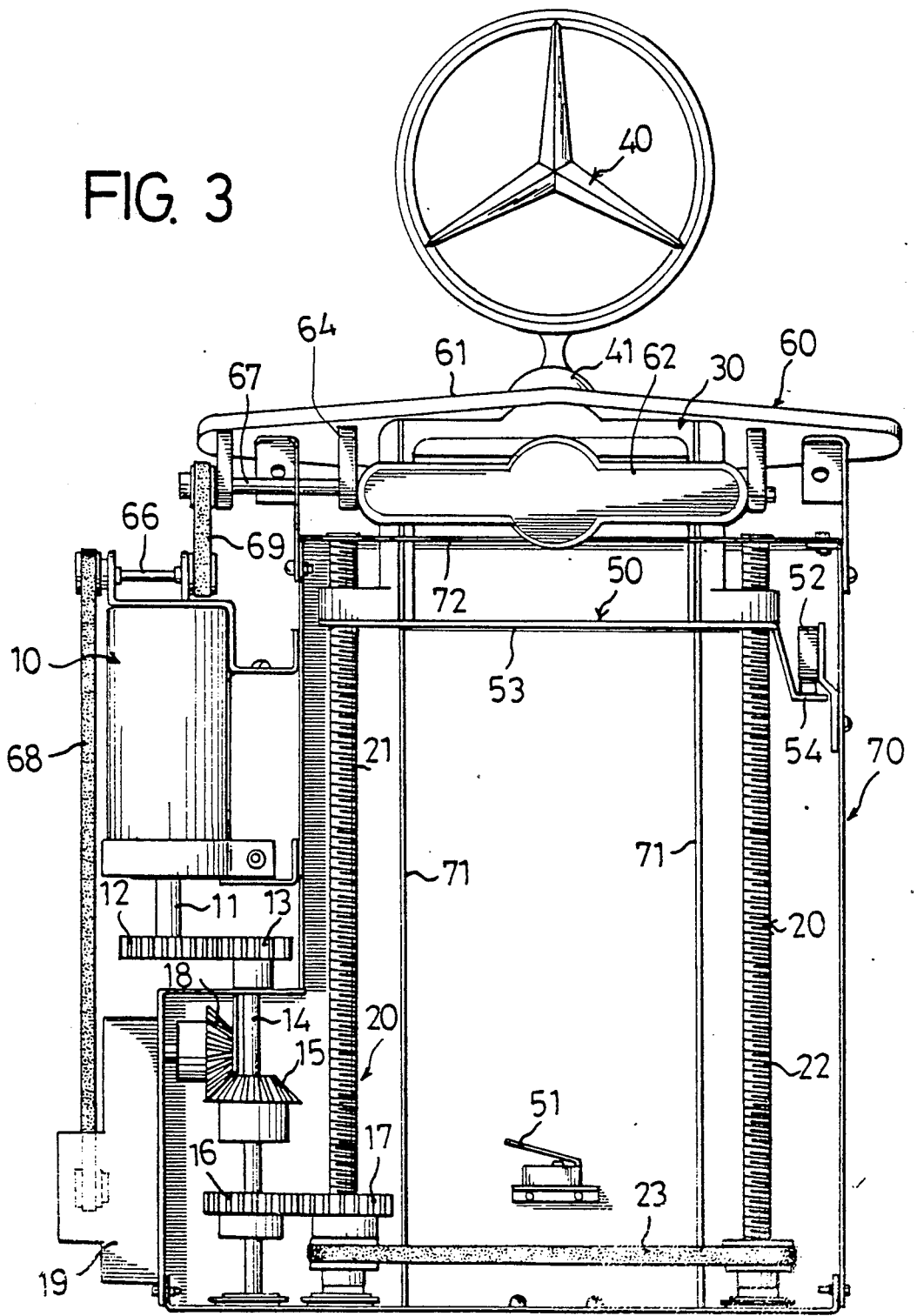
FIG. 3 is a front view similar to FIG. 2, showing the car mark emblem in a display position.

Thus, when the guide screw unit 20 is actuated by the motor 10, the seat 30 will be raised or lowered synchronously. Accordingly, the mark emblem 40 which is fixed on th seat 30 will be raised synchronously to a display position as shown in FIG. 2 or lowered synchronously to a storage position as shown in FIG. 3.

The limit control unit 50 comprises a lower limit switch 51 and an upper limit switch 52. The lower limit switch 51 is provided on an inner bottom face of the body frame 70. The upper limit switch 52 is provided on an upper portion of the body frame 70 at a face proximate to the second guide screw 22.

A bottom panel 53 having a side wing 54 at a face proximate to the second guide screw 22 is provided at the lower part of the seat 30. As is the same as the seat 30, the bottom panel 53 has two end holes so as to encompass the two elongated guide screws 21 and 22 and thus be actuated by the motor 10 to ascend or descend synchronously.

Due to the provision of the lower limit switch 51 on the bottom face of the body frame 70, the seat 30 stops descending when the bottom face of the bottom panel 53 touches the lower limit switch 51.

Due to the provision of the upper limit switch 52 on the upper portion of the body frame 70 at a face proximate to the second guide screw 22, the seat 30 stops ascending when the side wing 54 of the bottom panel 53 touches the upper limit switch 52.

The upper limit switch 52 is fixed onto the body frame 70 by means of screws or the like. It is appreciated that the location of this upper limit swictch 52 is such that the mark emblem 40 is fully protrudable from the car hood.

It is appreciated that the provision of the upper and lower limit switches 51 and 52 not only limits the further motion of the seat 30 but also controls the direction (clockwise or counterclockwise) of rotation of the motor 10 by external engagement with a relay (not shown) which is known in the art and thus requires no further description.

Although not limited thereto, it is preferable that the upper and lower limit switches 51 and 52 are microadjusting switches.

The top cover unit 60 is provided at an uppermost part of the body frame 70. The top cover unit 60 includes a top cover 61 and a movable cover 62. The top cover 61 has an opening 63 for the passgae of the mark emblem 40. The movable cover 62 is provided to controllably cover the opening 63. (The mark emblem 40 as shown in FIG. 1 is at a storage position and the opening 63 should at that situation be covered by the movable cover 62, however, the movable cover 62 is shown in FIG. 1 not covering the opening 63 for the purpose of better illustration.) The top cover 61 further includes two downwardly extending pieces 64 for hinging with the movable cover 62. The movable cover 62 is thus pivotally hinged to the top cover 61. Perferably, the top cover 61 includes two stoppers 65 (see FIG. 2) on an inner surface thereof to restrict the movable cover 62 from further movement once the movable cover 62 has been brought into position.

The movable cover 62 is actuated by the motor 10. As has been mentioned previously, the motor 10 includes sequentially a first shaft 11 and a first gear 12 extending from the body of the motor 10, a second gear 13 which is meshed with the first gear 12, a second shaft 14 which is coaxial with the second gear 13, a first bevel gear 15 which is coaxial with the second gear 13, a third gear 16 which is coaxial with the second gear 13, and a fourth gear 17 which is meshed with the third gear 16. As can be seen in the drawings, a second bevel gear 18 is meshed with the first bevel gear 15 for transmission of power so as to actuate the movable cover 62. The rotation of the second bevel gear 18 is reduced by means of a reduction gear box 19 to sequentially drive a first connecting shaft 66 and a second connecting shaft 67 by means of a first belt 68 and a second belt 69 respectively.

Thus, the movable cover 62 can be turned through an angle of about 90 degrees from a position away from the opening 63 to a position right under the opening 63 and finally rest on the stoppers 64 when the opening 63 is exactly covered by the movable cover 62.

It is appreciated from the drawings, particularly FIGS. 1 and 3, that a top panel 72 is formed on an upper part of the guide screw unit 20. The top panel 72 has an opening 73 for the passage of the mark emblem 40. The provision of this top panel panel 72 is to restrict the movable cover 62 from further movement once the movable cover 62 has been brought into a lateral position so as to avoid contact of the movable cover 62 with the mark emblem 40.

When the mark emblem 40 is in a storage position, the opening 63 is sealed for better protection of the mark emblem 40. When the mark emblem 40 is to be raised, the opening 63 is uncovered by the movable cover 62 such that the mark emblem 40 can pass through the opening 63 to protrude from the car hood.

At this juncture, the seat 30 on the guide screw unit 20 is driven to ascend. The spherical stand 41 of the mark emblem 40 which is set in the circular rack 33 of the seat 30 is raised to pass through the opening 63 of the top cover 61 to display the mark emblem 40.

As has been mentioned previously, the motor 10 is electrically-connected with the third terminal of the ignition system of the car engine. When starting the car engine, the third terminal of the ingition system is actuated at first causing the motor 10 to rotate in a clockwise direction. Accordingly, the guide screw unit 20 rotates and raises the mark emblem 40. In the meantime, the first belt 68 and the second belt 69 are actuated by the motor 10 to drive the movable cover 62 to move lateral to a side thereof such that the opening 63 is uncovered by the movable cover 62 (see FIG. 3).

When stopping the car engine, the third terminal of the ignition system is actuated at first causing the motor 10 to rotate in a counterclockwise direction. Thus, the guide screw unit 20 rotates in reverse and lowers the mark emblem 40. In the meantime, the first belt 68 and the second belt 69 are actuated by the motor 10 to drive the movable cover 62 to move in an opposite direction such that the opening 63 is covered by the movable cover 62 (see FIG. 2).

It is to be appreciated that the vertical displacement of the mark emblem 40 is considerably larger than the angular displacement of the movable cover 502. In one embodiment, accurate timing and calculation is adopted to design the structure of the reduction gear box 19 such that the opening 63 is timely uncovered by the movable cover 62 to let the rising mark emblem 40 pass through and also the opening 63 is timely covered by the movable cover 62 when the mark emblem 40 has been fully lowered to the storage position.

In an alternative embodiment, the reduction gear box 19 is not designed to exactly match the timing for the reason of minimizing the size of the reduction gear box 19. In this case, the belt 69 is substantially loosely set between the shaft 67 such that the belt 69 can slip over the shaft 67 in order that the opening 63 is totally uncovered by the movable cover 62 prior to the full ascent of the mark emblem 40 or the movable cover 62 is moved to an about-to-close position when the mark emblem 40 is still passing through the opening 63 whereas the body of mark emblem 40 thus blocks the further motion of the movable cover 62 until it has been fully lowered to the storage position.

While the present invention has been explained in relation to its preferred embodiment, it is to be understood that various modifications thereof will be apparent to those skilled in the art upon reading this specification. The invention disclosed herein is therefore intended to cover all such modifications as fall within the scope of the appended claims.

I claim:

1. A car mark emblem display and storage device for displaying a car mark emblem to protrude from a car engine hood or storing the car mark emblem in the car engine hood, comprising:
   a motor;
   a guide screw unit actuated by said motor, including two elongated parallel spaced vertically extending guide screws, a distance defined between said two elongated guide screws being such that said mark emblem retained therewithin is readily movable in a vertical direction;
   a seat for supporting said mark emblem, said seat being slidable vertically along said two elongated guide screws and including a partially circular rack for fixing a spherical stand of said mark emblem;
   a limit control unit including a lower limit switch, an upper limit switch, and a bottom panel having a side wing, said bottom panel being slidable vertically along said two elongated guide screws; a lower face of said bottom panel being contactable with said lower limit switch when said mark emblem has been fully lowered, said side wing being contactable with said upper limit switch when said mark emblem has been fully raised;
   a top cover unit for mounting on said car engine hood, said top cover unit including a top cover with a first opening for the passage of said mark emblem and a movable cover for movably covering said opening, said movable cover being actuated by said motor;
   a body frame for retaining said motor, said guide screw unit, said seat and combined with said top cover unit.

2. A car mark emblem display and storage device as claimed in claim 1, wherein said motor comprises sequentially a first shaft and a first gear extending from a body of said motor, a second gear which is meshed with said first gear, a second shaft which is coaxial with said second gear, a first bevel gear which is coaxial with said second gear, a third gear which is coaxial with said second gear, and a fourth gear which is meshed with said third gear.

3. A car mark emblem display and storage device as claimed in claim 2, wherein a first guide screw of said guide screw unit is encompassed by said fourth gear at a lower part thereof.

4. A car mark emblem display and storage device as claimed in claim 3, wherein a second guide screw of said guide crew unit is engaged with said first guide screw by a belt.

5. A car mark emblem display and storage device as claimed in claim 4, wherein said seat is an inverted U-shaped body having two lengthwise extending arms each having a hole which encompass said two elongated guide screws 6. A car mark emblem display and storage device as claimed in claim 5, wherein said seat includes said partially circular rack at an upper central part thereof for retaining said mark emblem.

7. A car mark emblem display and storage device as claimed in claim 6, wherein both arms of said seat are formed with a front and a rear vertical guiding grooves respectively and said body frame is provided with corresponding guiding rails so as to guide the vertical movement of said seat along said two guide screws.

8. A car mark emblem display and storage device as claimed in claim 7, wherein said mark emblem includes said spherical stand set in said partially circular rack of said seat.

9. A car mark emblem display and storage device as claimed in claim 8, wherein said lower limit switch is provided on an inner bottom face of the body frame.

10. A car mark emblem display and storage device as claimed in claim 8, wherein said upper limit switch is provided on an upper portion of said body frame at a face proximate to said second guide screw.

11. A car mark emblem display and storage device as claimed in claim 10, wherein said bottom panel is provided at a lower part of said seat.

12. A car mark emblem display and storage device as claimed in claim 11, wherein said bottom panel has two end holes so as to encompass said two elongated guide screws.

13. A car mark emblem display and storage device as claimed in claim 12, wherein said upper and lower limit switches are micro-adjusting switches.

14. A car mark emblem display and storage device as claimed in claim 13, wherein said top cover includes two downwardly extending pieces for hinging with said movable cover.

15. A car mark emblem display and storage device as claimed in claim 14, wherein said top cover includes two stoppers on an inner surface thereof.

16. A car mark emblem display and storage device as claimed in claim 15, wherein a second bevel gear is meshed with said first bevel gear for transmission of power to actuate said movable cover.

17. A car mark emblem display and storage device as claimed in claim 16, wherein rotation of said second bevel gear is reduced by a reduction gear box to actuate said movable cover through sequentially driving a first connecting shaft and a second connecting shaft by a first belt and a second belt respectively.

18. A car mark emblem display and storage device as claimed in claim 17, wherein a top panel is formed on an upper part of the guide screw unit and wherein said top panel has a second opening for the passage of said mark emblem.

19. A car mark emblem display and storage device for displaying a car mark emblem to protrude from a car engine hood or storing the car mark emblem in the car engine hood, comprising:
   a motor comprising a first shaft and a first gear extending from a body of said motor, a second gear which is meshed with said first gear, a second shaft which is coaxial with said second gear, a first bevel gear which is coaxial with said second gear, a third gear which is coaxial with said second gear, and a fourth gear which is meshed with said third gear;

a guide screw unit actuated by said motor, including two elongated parallel spaced vertically extending guide screws, a distance defined between the two elongated guide screws being such that the mark emblem retained therewithin is movable in a vertical direction, said first guide screw being encompassed by said fourth gear at a lower part thereof, said second guide screw being engaged with said first guide screw by a belt;

a seat for supporting said mark emblem arranged between said two elongated guide screws, said seat being an inverted U-shaped body having two sideward extending arms each having a hole encompassing said two elongated guide screws, said seat being slidable vertically along said two elongated guide screws and including a partially circular rack for fixing a spherical stand of said mark emblem;

a limit control unit including a lower limit switch on an inner bottom face of a body frame, an upper limit switch on an upper portion of said body frame at a face proximate to said second guide screw, and a bottom panel at a lower part of said seat, said bottom panel having two end holes so as to encompass said two elongated guide screws and to be vertically slidable along said two elongated guide screws, said bottom panel having a side wing, a lower face of said bottom panel being contactable with said lower limit switch when said mark emblem has been fully lowered, said side wing being contactable with said upper limit switch when said mark emblem has been fully raised;

a top cover unit for mounting on said engine hood, said top cover unit including a top cover with an opening for the passage of said mark emblem, a movable cover for movably covering said opening, two dowwardly extending pieces for hinging said top cover with said movable cover, and two stoppers on an inner surface of said top cover, a second bevel gear being meshed with said first bevel gear for transmission of power to actuate said movable cover, whereas rotation of said second bevel gear being reduced by a reduction gear box to actuate said movable cover through sequentially driving a first connecting shaft and a second connecting shaft by a first belt and a second belt respectively; and said body brame for retaining said motor, said guide screw unit, said seat and combined with said top cover unit.

20. A car mark emblem display and storage device as claimed in claim 19, wherein said upper and lower limit switches are micro-adjusting switches.

* * * * *